US012356182B2

(12) United States Patent
Kunz et al.

(10) Patent No.: US 12,356,182 B2
(45) Date of Patent: Jul. 8, 2025

(54) SECURING COMMUNICATIONS BETWEEN USER EQUIPMENT DEVICES

(71) Applicant: Lenovo (Singapore) Pte. Ltd., New Tech Park (SG)

(72) Inventors: Andreas Kunz, Ladenburg (DE); Sheeba Backia Mary Baskaran, Friedrichsdorf (DE); Dimitrios Karampatsis, Ruislip (GB)

(73) Assignee: Lenovo (Singapore) Pte. Ltd., Singapore (SG)

( * ) Notice: Subject to any disclaimer, the term of this patent is extended or adjusted under 35 U.S.C. 154(b) by 191 days.

(21) Appl. No.: 18/020,035

(22) PCT Filed: Aug. 6, 2021

(86) PCT No.: PCT/IB2021/057236
§ 371 (c)(1),
(2) Date: Feb. 6, 2023

(87) PCT Pub. No.: WO2022/029702
PCT Pub. Date: Feb. 10, 2022

(65) Prior Publication Data
US 2023/0292114 A1    Sep. 14, 2023

Related U.S. Application Data

(60) Provisional application No. 63/062,264, filed on Aug. 6, 2020.

(51) Int. Cl.
*H04W 12/041* (2021.01)
*H04W 12/069* (2021.01)
*H04W 76/14* (2018.01)

(52) U.S. Cl.
CPC ....... *H04W 12/041* (2021.01); *H04W 12/069* (2021.01); *H04W 76/14* (2018.02)

(58) Field of Classification Search
CPC .. H04W 12/041; H04W 76/14; H04W 12/063
See application file for complete search history.

(56) References Cited

U.S. PATENT DOCUMENTS

2016/0112896 A1* 4/2016 Karampatsis ........... H04L 47/22
370/230.1
2018/0184297 A1* 6/2018 Mohamed ............. H04W 12/08
(Continued)

FOREIGN PATENT DOCUMENTS

WO         2020033905 A1    2/2020
WO    WO-2021174464 A1 *    9/2021

OTHER PUBLICATIONS

SA WG2 Meeting #139e Jun. 1-12, 2020, e-meeting (Year: 2020).*
(Continued)

*Primary Examiner* — Darshan I Dhruv
(74) *Attorney, Agent, or Firm* — Kunzler Bean & Adamson

(57) ABSTRACT

Apparatuses, methods, and systems are disclosed for securing communications between user equipment devices. One apparatus includes a processor that derives, at a first user equipment ("UE") device in communication with a mobile wireless communication network, a security key for securing communications between the first UE and a second UE via the mobile wireless communication network, the security key derived based on at least one parameter associated with the first UE and the second UE. The processor establishes a secure communication between the first UE and the second UE via a first network function of the mobile wireless communication network using the derived security key.

19 Claims, 10 Drawing Sheets

(56) References Cited

U.S. PATENT DOCUMENTS

| | | | |
|---|---|---|---|
| 2020/0162434 A1 | 5/2020 | Tang et al. | |
| 2020/0178076 A1 | 6/2020 | Ben Henda et al. | |
| 2021/0099870 A1* | 4/2021 | Moon | H04W 8/08 |
| 2021/0206492 A1* | 7/2021 | Faccin | H04B 7/18506 |
| 2021/0352558 A1* | 11/2021 | Pu | H04B 7/18504 |
| 2022/0377545 A1* | 11/2022 | Wang | G08G 5/57 |
| 2023/0133187 A1* | 5/2023 | Ferdi | H04L 63/08 |
| | | | 455/411 |
| 2023/0199863 A1* | 6/2023 | Ferdi | H04W 76/10 |
| | | | 370/329 |

OTHER PUBLICATIONS

PCT/IB2021/057236, "Notification of Transmittal of the International Search Report and the Written Opinion of the International Searching Authority, or the Declaration", International Searching Authority, Nov. 3, 2021, pp. 1-16.

Chen et al., "NAT64 Deployment Options and Experience", IETF RFC 7269, Jun. 2014, pp. 1-22.

Interdigital, "Solution for UAV Authentication and Authorization by USS/UTM using key bootstrapping based on 3GPP credentials", SA WG2 Meeting #139e S2-2004166, Jun. 1-12, 2020, pp. 1-6.

3GPP, "3rd Generation Partnership Project; Technical Specification Group Services and System Aspects; Study on supporting Unmanned Aerial Systems (UAS) connectivity, Identification and tracking (Release 17)", 3GPP TR 23.754 V0.2.0, Jun. 2020, pp. 1-83.

3GPP, "3rd Generation Partnership Project; Technical Specification Group Services and System Aspects; Security architecture and procedures for 5G system (Release 16)", 3GPP TS 33.501 V16.3.0, Jul. 2020, pp. 1-248.

* cited by examiner

SECURING COMMUNICATIONS BETWEEN USER EQUIPMENT DEVICES

CROSS-REFERENCE TO RELATED APPLICATIONS

This application claims priority to U.S. Provisional Patent Application No. 63/062,264 entitled "METHOD OF ESTABLISHMENT OF A SECURE COMMUNICATION CHANNEL BETWEEN UAV CONTROLLER AND UAV" and filed on Aug. 6, 2020, for Andreas Kunz, et al., which is incorporated herein by reference.

FIELD

The subject matter disclosed herein relates generally to wireless communications and more particularly relates to securing communications between user equipment devices.

BACKGROUND

In certain wireless communication systems, a User Equipment device ("UE") is able to connect with a fifth-generation ("5G") core network (i.e., "5GC") in a Public Land Mobile Network ("PLMN"). In wireless networks, unmanned aerial systems ("UASs") may include unmanned aerial vehicles ("UAVs"), UAV controllers ("UAV-Cs"), UAS service suppliers ("USSs") and UAS traffic management ("UTM") functions that communicate via wireless communication systems.

BRIEF SUMMARY

Disclosed are procedures for securing communications between user equipment devices. Said procedures may be implemented by apparatus, systems, methods, and/or computer program products.

One method of a UE, e.g., a UAV and/or a UAV-C includes deriving, at a first user equipment ("UE") device in communication with a mobile wireless communication network, a security key for securing communications between the first UE and a second UE via the mobile wireless communication network, the security key derived based on at least one parameter associated with the first UE and the second UE. In one embodiment, the method includes establishing a secure communication between the first UE and the second UE via a first network function of the mobile wireless communication network using the derived security key.

One method of a network function (e.g., USS/UTM) in a mobile communication network includes deriving, at a first network function of a mobile wireless communication network, a security key for securing communications between an unmanned aerial vehicle ("UAV") and a UAV controller via the mobile wireless communication network, the security key derived based on at least one parameter associated with the UAV and the UAV controller comprises an identifier for the UAV and an identifier for the UAV controller. In one embodiment, the method includes sending the derived security key to a second network function, the second network function securing communications between the UAV and the UAV controller using the security key.

One method of another network function (e.g., UAV GW) in a mobile communication network includes receiving, at a first network function from a second network function, an authentication result for a first UE device, a first security key derived at the first network function, an identifier for the first UE device, and an identifier for a second UE device configured to communicate with the first UE device. In one embodiment, the method includes sending, from the first network function, the authentication result to the first UE device, and receiving, at the first network function, a second security key from the first UE device, the second security key derived at the first UE device and matching the first security key.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
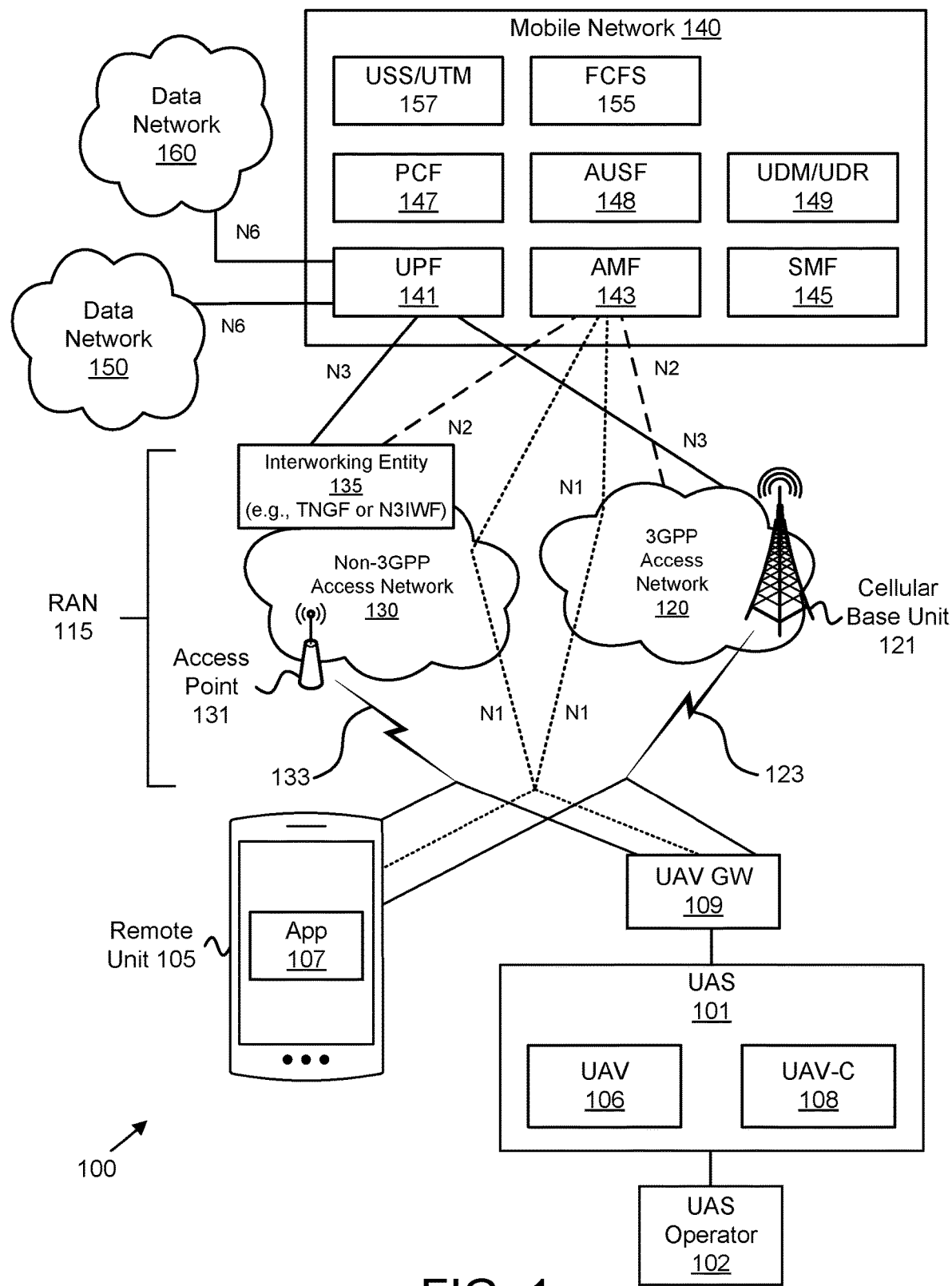
FIG. 1 is a schematic block diagram illustrating one embodiment of a wireless communication system for securing communications between user equipment devices.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for securing communications between user equipment devices. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

An unmanned aerial system ("UAS"), in one embodiment, consists of different components: an unmanned aerial vehicle ("UAV"), a controller for the UAV ("UAV-C"), a UAS service supplier ("USS") and a UAS traffic management ("UTM") function. The UAV controller, in one embodiment, needs to send control messages to the UAV in a secure way that the UAV cannot be hijacked and misused. User plane integrity protection can be used in 5G, but not in 4G. Furthermore, it is computationally expensive and requires processing resources that may not be available in UE devices such as UAVs. The UAV-C and UAV may additionally be located in different networks and may use different radio access technologies. This disclosure proposes solutions to secure communications between the UAV-C and the UAV.

FIG. 1 depicts a wireless communication system 100 for securing communications between user equipment devices, according to embodiments of the disclosure. In one embodiment, the wireless communication system 100 includes at least one remote unit 105, a Fifth-Generation Radio Access Network ("5G-RAN") 115, a mobile core network 140, a UAV gateway 109, and a UAS 101. The 5G-RAN 115 and the mobile core network 140 form a mobile communication network. The 5G-RAN 115 may be composed of a 3GPP access network 120 containing at least one cellular base unit 121 and/or a non-3GPP access network 130 containing at least one access point 131. The remote unit 105 communicates with the 3GPP access network 120 using 3GPP communication links 123 and/or communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the RAN 120 is compliant with the 5G system specified in the Third Generation Partnership Project ("3GPP") specifications. For example, the RAN 120 may be a NG-RAN, implementing NR RAT and/or LTE RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host (e.g., in the data network 150 or in the data network 160) via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the 5G-RAN 115 (i.e., via the 3GPP access network 120 and/or non-3GPP network 130). The mobile core network 140 then relays traffic between the remote unit 105 and the remote host using the PDU session. The PDU session represents a logical connection between the remote unit 105 and a User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. Additionally—or alternatively—the remote unit 105 may have at least one PDU session for communicating with the packet data network 160. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 130. In certain embodiments, there is a one-to-one mapping between an EPS Bearer and a QoS profile, such that all packets belonging to a specific EPS Bearer have the same QoS Class Identifier ("QCI").

As described in greater detail below, the remote unit 105 may use a first data connection (e.g., PDU Session) established with the first mobile core network 130 to establish a second data connection (e.g., part of a second PDU session) with the second mobile core network 140. When establishing a data connection (e.g., PDU session) with the second mobile core network 140, the remote unit 105 uses the first data connection to register with the second mobile core network 140.

The cellular base units 121 may be distributed over a geographic region. In certain embodiments, a cellular base unit 121 may also be referred to as an access terminal, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121. Note that during NR operation on unlicensed spectrum (referred to as "NR-U"), the base unit 121 and the remote unit 105 communicate over unlicensed (i.e., shared) radio spectrum.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking entity 135. The interworking entity 135 provides an interworking between the non-3GPP access network 130 and the mobile core network 140. The interworking entity 135 supports connectivity via the "N2" and "N3" interfaces. As depicted, both the 3GPP access network 120 and the interworking entity 135 communicate with the AMF 143 using a "N2" interface. The 3GPP access network 120 and interworking entity 135 also communicate with the UPF 141 using a "N3" interface. While depicted as outside the mobile core network 140, in other embodiments the interworking entity 135 may be a part of the core network. While depicted as outside the non-3GPP RAN 130, in other embodiments the interworking entity 135 may be a part of the non-3GPP RAN 130.

In one embodiment, the UAS 101 comprises components, networks, hardware, software, and/or the like for conducting unmanned aircraft operations between a UAV 106, e.g., a drone, and a UAV controller 108. The UAV 106 may refer to an aircraft without a human pilot, crew, or passengers that is remotely controlled using a UAV controller 108. A UAV controller 108 may refer to device that is configured to wirelessly send instructions to the UAV 106 for controlling the UAV, e.g., for controlling the speed, direction, orientation, and/or the like of the UAV, e.g., via the mobile network 140, an access network 120, 130, and/or the like. The UAS operator 102 may be the person who operates the UAV 106 (e.g., via the UAV controller 108) and who, typically, requests flight authorizations. The UAV 106 and UAV controller 108 may each be UEs in the wireless communication system 100 and/or may include an instance of a remote unit 105. As such, the UAV 106 and/or the UAV controller 108 may communicate with an access network 120 to access services provided by a mobile core network 140.

In some embodiments, the UAV 106 and/or the UAV-C controller 108 communicates with a FCFS 155 and/or a USS/UTM 157 function via a network connection with the mobile core network 140. The USS/UTM 157, in one embodiment, provides a set of overlapping USSs that assist UAV 106 operators 102 in conducting safe and compliant operations. The services may include deconfliction of flight plans, remote identification, and/or the like.

As described below, the UAV 106 and/or UAV controller 108 may establish a PDU session (or similar data connection) with the mobile core network 140 using the RAN 115. The mobile core network 140 may then relay traffic between the UAV 106 and the UAV controller 108 and the packet data network 150 using the PDU session.

In one embodiment, the UAV gateway 109 is a local mobile edge computing ("MEC") platform to support the low latency control signaling between the UAV-C 108 and the UAV 106. The UAV GW 109 may also be the collocated with one or more PDU session anchors ("PSAs"), user plane functions ("UPFs") or could be implemented as a cloud service. As used herein, it is assumed for simplicity that the UAV GW 109 is acting as a MEC platform, hosting an edge application server for UAS services, e.g., providing a secure communication channel between a UAV-C 108 and a UAV 106.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network. An interworking entity 135 deployed in a trusted non-3GPP access network 130 may be referred to herein as a Trusted Network Gateway Function ("TNGF"). An interworking entity 135 deployed in a non-trusted non-3GPP access network 130 may be referred to herein as a non-3GPP interworking function ("N3IWF"). While depicted as a part of the non-3GPP access network 130, in some embodiments the N3IWF may be a part of the mobile core network 140 or may be located in the data network 150.

In one embodiment, the mobile core network 140 is a 5G core ("5GC") or the evolved packet core ("EPC"), which may be coupled to a data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF ("UPF") 141. The mobile core network 140 also includes multiple control plane functions including, but not limited to, an Access and Mobility Management Function ("AMF") 143 that serves the 5G-RAN 115, a Session Management Function ("SMF") 145, a Policy Control Function ("PCF") 146, an Authentication Server Function ("AUSF") 147, a Unified Data Management ("UDM") and Unified Data Repository function ("UDR").

The UPF(s) 141 is responsible for packet routing and forwarding, packet inspection, QoS handling, and external PDU session for interconnecting Data Network ("DN"), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration for UPF for proper traffic routing.

The PCF 146 is responsible for unified policy framework, providing policy rules to CP functions, access subscription information for policy decisions in UDR. The AUSF 147 acts as an authentication server.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include an Network Exposure Function ("NEF") (which is responsible for making network data and resources easily accessible to customers and network partners, e.g., via one or more APIs), a Network Repository Function ("NRF") (which provides NF service registration and discovery, enabling NFs to identify appropriate services in one another and communicate with each other over Application Programming Interfaces ("APIs")), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a S-NSSAI, while a set of network slices for which the remote unit 105 is authorized to use is identified by NSSAI. In certain embodiments, the various network slices may include separate instances of network functions, such as the SMF and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 comprises an EPC, the depicted network functions may be replaced with appropriate EPC entities, such as an MME, S-GW, P-GW, HSS, and the like.

While FIG. 1 depicts components of a 5G RAN and a 5G core network, the described embodiments for using a pseudonym for access authentication over non-3GPP access apply to other types of communication networks and RATs, including IEEE 802.11 variants, GSM, GPRS, UMTS, LTE variants, CDMA 2000, Bluetooth, ZigBee, Sigfoxx, and the like. For example, in an 4G/LTE variant involving an EPC, the AMF 143 may be mapped to an MME, the SMF mapped to a control plane portion of a PGW and/or to an MME, the UPF 141 may be mapped to an SGW and a user plane portion of the PGW, the UDM/UDR 149 may be mapped to an HSS, etc.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

The solutions disclosed herein, in one embodiment, assume that first the UAV-C 108 performs a pairing with the UAV 106 such that the identities of the two are associated or linked in the USS/UTM 157. In one embodiment, a solution is disclosed to setup a secure direct connection between the UAV-C 108 and the UAV 106 for sending control messages to the UAV 106, utilizing the key data generated during the authentication procedure.

In certain embodiments, it is also assumed that the UAV 106 and the USS/UTM 157 as well as the UAV-C 108 and the USS/UTM 157 are configured with a pre-shared key $K_{psk}$, a certificate, or the like, depending on the authentication method used between the UAV 106 and the USS/UTM 157.

Figure 2:
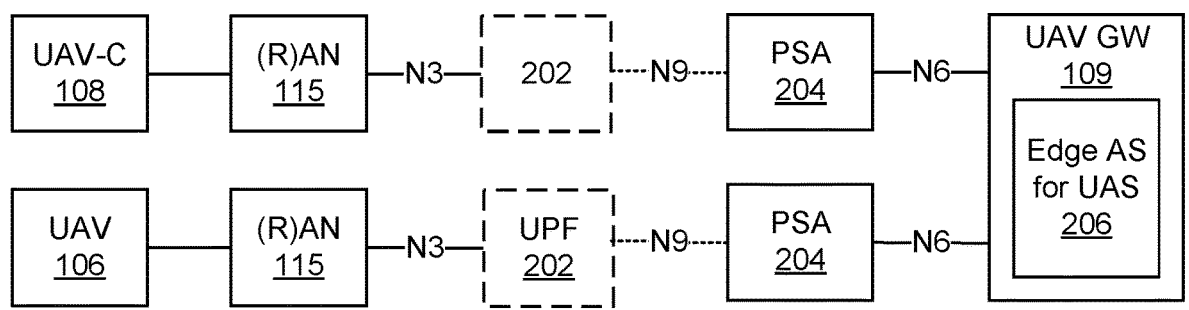
FIG. 2 is a diagram illustrating one embodiment of a UAV gateway embodied as a MEC platform.

FIG. 2 is a diagram illustrating a UAV GW 109 embodied as a MEC platform. As shown in FIG. 2, in one embodiment, the UAV GW 109 is a local MEC platform to support low latency control signaling between the UAV-C 108 and the UAV 106. The UAV GW 109 may also be co-located with one or more PDU session anchors ("PSAs"), user plane functions ("UPFs") or could be implemented as a cloud service. As used herein, it is assumed for simplicity that the UAV GW 109 is acting as a MEC platform, hosting an edge application server for UAS services, e.g., providing a secure communication channel between a UAV-C 108 and a UAV 106.

Figure 3:
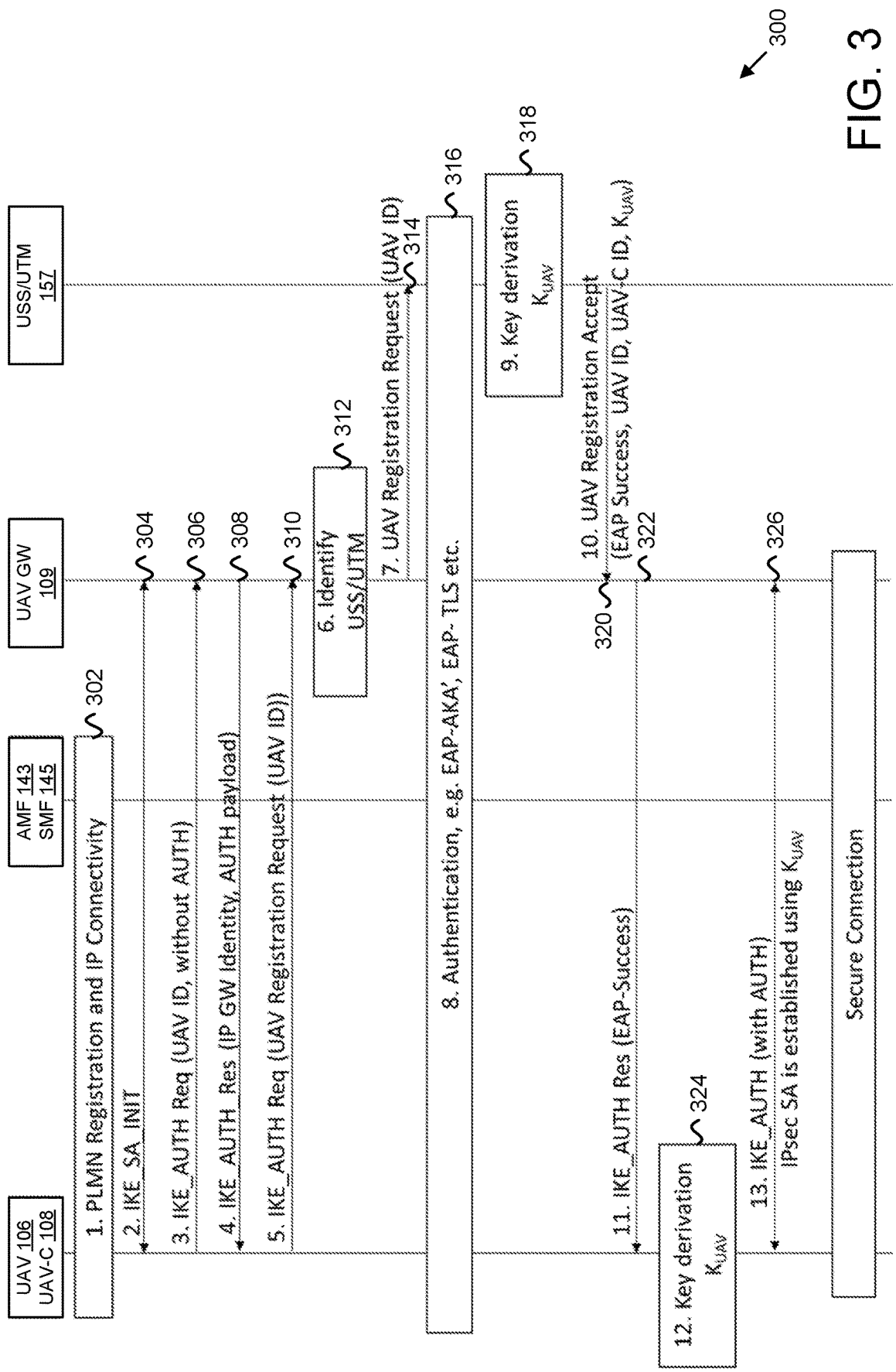
FIG. 3 is a signal flow diagram illustrating one embodiment of a procedure for secure communication setup with IPSec.

FIG. 3 depicts a signal flow diagram illustrating one embodiment of a procedure 300 for securing communications between user equipment devices. The procedure 300 involves the UAV 106, the AMF 143/SMF 145, the UAV GW 109, and the USS/UTM 157. In one embodiment, one or more steps of the procedure 300 are performed by a USS/UTM 157, a UAV GW 109, an authentication server, another network function, and/or a network equipment apparatus 700, described below.

In one embodiment, the procedure 300 enables secure communications between the UAV 106 or UAV-C 108 and the UAV GW 109. For simplicity, the steps of the procedure 300 below are described for the UAV 106 but are equally applicable to the UAV-C 108. At FIG. 3, the procedure 300 begins at step 1, in one embodiment, where the UAV 106 registers (see block 302) to the PLMN, via the AMF 143 or the SMF 145.

At step 2, in one embodiment, the UAV 106 proceeds with establishing (see messaging 304) an IPsec Security Association ("SA") with the selected UAV GW 109 by initiating an IKE initial exchange, e.g., according to RFC 7296. After step 2, in certain embodiments, subsequent IKE messages are encrypted, and integrity protected using the IKE SA.

In one embodiment, at step 3, the UAV 106 initiates (see messaging 304) an IKE AUTH exchange by sending an IKE AUTH request message. The AUTH payload may not be included in the IKE AUTH request message, which indicates that the IKE AUTH exchange uses Extensible Authentication Protocol ("EAP") signalling. In one embodiment, in the IDi, the UAV 106 sets the ID type as ID_KEY-ID in the message and sets its value equal to any random number, e.g., as per RFC 7296. In one embodiment, the UAV 106 does not use its identifier, e.g., its GUTI/SUCI/SUPI as the identifier in this step. If the UAV 106 is provisioned with the USS/UTM 157 root certificate, in one embodiment, it includes the CERTREQ payload within the IKE AUTH request message to request the USS/UTM's 157 certificate.

At step 4, in one embodiment, the UAV GW 109 responds (see messaging 308) with an IKE AUTH response message that includes the UAV GW identity, the AUTH payload to protect the previous message it sent to the UAV 106 (e.g., in the IKE_SA_NIT exchange). If the UAV 106 has sent a CERTREQ payload in step 3, in one embodiment, the UAV GW 109 shall also include the CERT payload including the UAV GW certificate. This message may include an EAP Identity request to initiate an EAP-based authentication.

At step 5, the UAV 106, in one embodiment, validates the UAV GW certificate and confirms that the UAV GW identity matches the UAV GW 109 selected by the UAV 106. An absence of the certificate from the UAV GW 109, in one embodiment, if the UAV 109 requested the certificate or unsuccessful identity confirmation results in a connection failure. The UAV 106, in one embodiment, sends an IKE AUTH request that includes a UAV Registration Request message containing the UAV identifier. The UAV Registration Request message may be an EAP Identity Response message to initiate the EAP authentication. In one embodiment, the UAV GW 109 does not send an EAP-Identity request because the UAV 106 includes its identity in the IKE AUTH request, e.g., like RFC 7296, clause 3.16.

At step 6, in one embodiment, the UAV GW 109 selects (see block 312) or identifies a USS/UTM 157. In one embodiment, at step 7, the UAV GW 109 forwards (see messaging 314) the UAV Registration Request that is received from the UAV 106 to the USS/UTM 157.

In one embodiment, at step 8, the USS/UTM 157 initiates (see block 316) an authentication procedure as preconfigured in the USS/UTM 157 and the UAV 106. In one embodiment, at step 9, after successful authentication, the USS/UTM 157 may derive (see block 318) a key $K_{UAV}$ by providing input to a key distribution function ("KDF") that includes at least one of the following parameters: a root key $K_{root}$, a UAV Controller ID, a UAV ID, and a Nonce, where $K_{UAV}$=KDF ($K_{root}$, UAV Controller ID, UAV ID, Nonce). The $K_{root}$ may be the $K_{psk}$ used for the authentication itself or may be the key resulting from the authentication e.g., an MSK or EMSK, truncated at e.g., 256 bits. In one embodiment, the USS/UTM 157 may generate a Nonce as input to the KDF, but if done in that way, then the Nonce is transferred in steps 10 and 11 below, together with an EAP Success indicator, to the UAV 106 so that the UAV 106 can derive the same $K_{UAV}$.

In one embodiment, at step 10, after successful authentication, the USS/UTM 157 sends (see messaging 320) the $K_{UAV}$ to the UAV GW 109 in a UAV Registration Accept message. This message may contain the Nonce if used in the key derivation as well as the UAV ID and the UAV-C ID to allow the UAV GW 109 to identify the two communication paths that should be associated or linked together. If an EAP method is used for authentication, in one embodiment, the USS/UTM 157 includes EAP-Success in the UAV Registration Accept message.

At step 11, in one embodiment, the UAV GW 109 sends (see messaging 322) the UAV Registration Accept message, including EAP-Success, to the UAV 106 without including the key $K_{UAV}$. This message may contain the Nonce if used in the key derivation. If the UAV GW 109 does not receive the $K_{UAV}$ from USS/UTM 157, in one embodiment, the UAV GW 109 shall respond with an EAP-Failure.

At step 12, in one embodiment, the UAV 106 derives (see block 324) the key $K_{UAV}$. At step 13, in one embodiment, an IPsec SA is established (see messaging 326) between the UAV 106 and UAV GW 109 using the UAV GW key $K_{UAV}$ that was created at the UAV 106 like the description in step 9.

Figure 4:
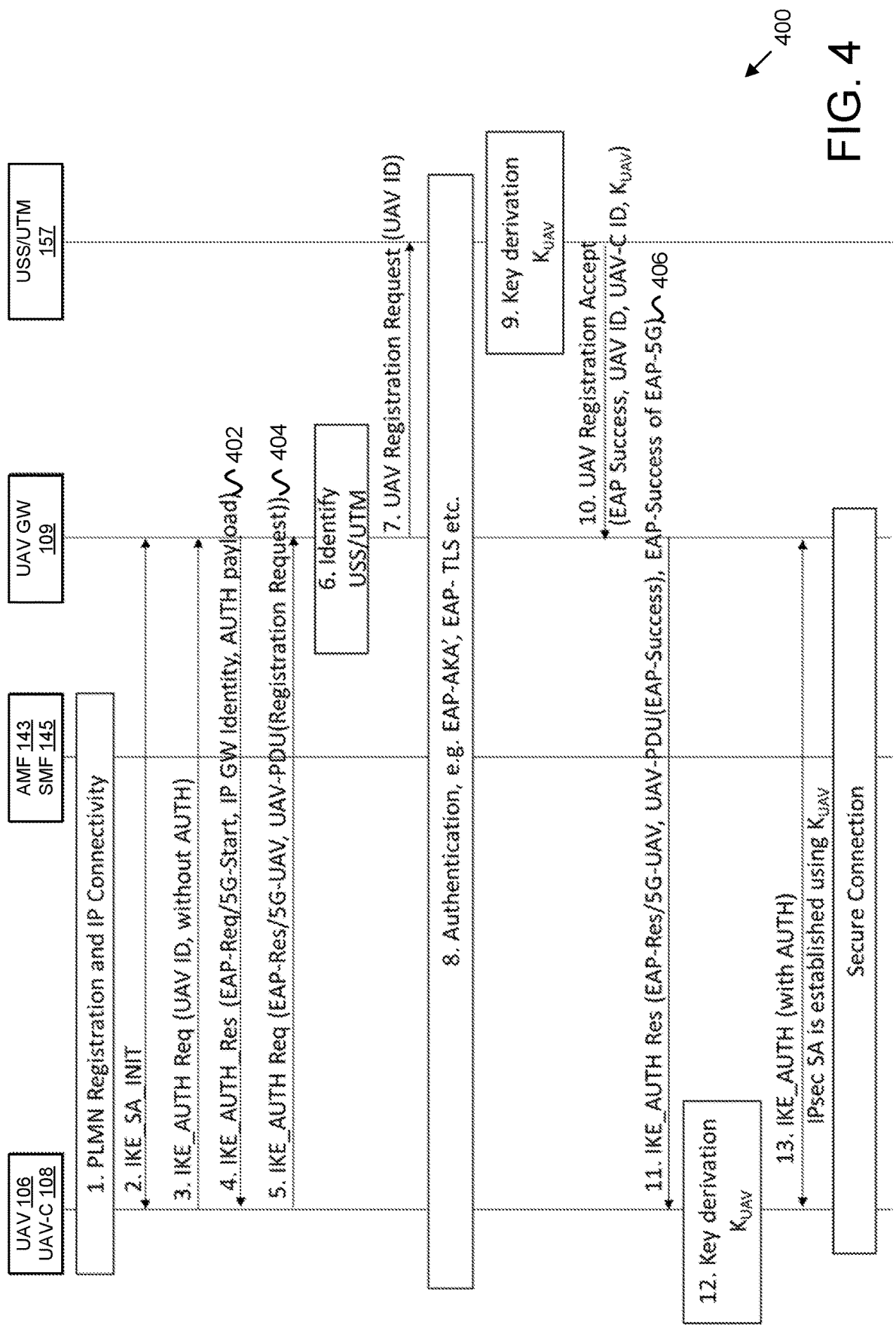
FIG. 4 is a signal flow diagram illustrating one embodiment of a procedure for secure communication setup with IPSec and EAP-5G.

FIG. 4 depicts a signal flow diagram illustrating one embodiment of a procedure 400 for securing communications between user equipment devices. The procedure 400 involves the UAV 106, the AMF 143/SMF 145, the UAV GW 109, and the USS/UTM 157. In one embodiment, one or more steps of the procedure 400 are performed by a USS/UTM 157, a UAV GW 109, an authentication server, another network function, and/or a network equipment apparatus 700, described below.

In one embodiment, the procedure 400 enables secure communications between the UAV 106 or UAV-C 108 and the UAV GW 109. For simplicity, the steps of the procedure 400 below are described for the UAV 106 but are equally applicable to the UAV-C 108. In certain embodiments, the procedure of FIG. 4 is substantially similar to the procedure 300 described above with reference to FIG. 3, except for steps 4, 5, and 11, described below.

At FIG. 4, at step 4, the UAV GW 109 responds (see messaging 402) with an IKE AUTH response message which includes the UAV GW identity, the AUTH payload to protect the previous message it sent to the UAV 106 (e.g., in the IKE_SA_NIT exchange) and an EAP-Request/5G-Start packet. The EAP-Request/5G-Start packet informs the UAV 106 to initiate an EAP-5G session, e.g., to start sending NAS messages encapsulated within EAP-5G packets. If the UAV 106 has sent a CERTREQ payload in step 3, the UAV GW 109 also includes the CERT payload including a UAV GW certificate.

At step 5, in one embodiment, the UAV 106 validates (see messaging 404) the UAV GW certificate and confirms that the UAV GW identity matches the UAV GW 109 selected by the UAV 106. In one embodiment, an absence of the certificate from the UAV GW 109, if the UAV 106 had requested the certificate, or unsuccessful identity confirmation, results in a connection failure. The UAV 106, in one embodiment, sends an IKE AUTH request that includes an EAP-Response/5G-UAV packet that contains a UAV Registration Request message containing the UAV ID. In one embodiment, the UAV GW 109 does not send an EAP-Identity request because the UAV 106 includes its identity in the IKE AUTH request in step 5, e.g., like in RFC 7296, clause 3.16

At step 11, in one embodiment, the UAV GW 109 sends an EAP-Response/5G-UAV packet with the UAV Registration Accept message to the UAV 106, including the EAP-Success of the authentication with the UAV GW 109, to the UAV 106 without including the $K_{UAV}$. The UAV GW 109 may send the EAP-Success/EAP-5G to the UAV 106 as part of the UAV Registration Accept message or in a subsequent response message. In one embodiment, this completes the EAP-5G session and no further EAP-5G packets are exchanged. If the UAV GW 109 does not receive the $K_{UAV}$ from USS/UTM, in one embodiment, the UAV GW 109 responds with an EAP-Failure to the UAV 106.

Figure 5:
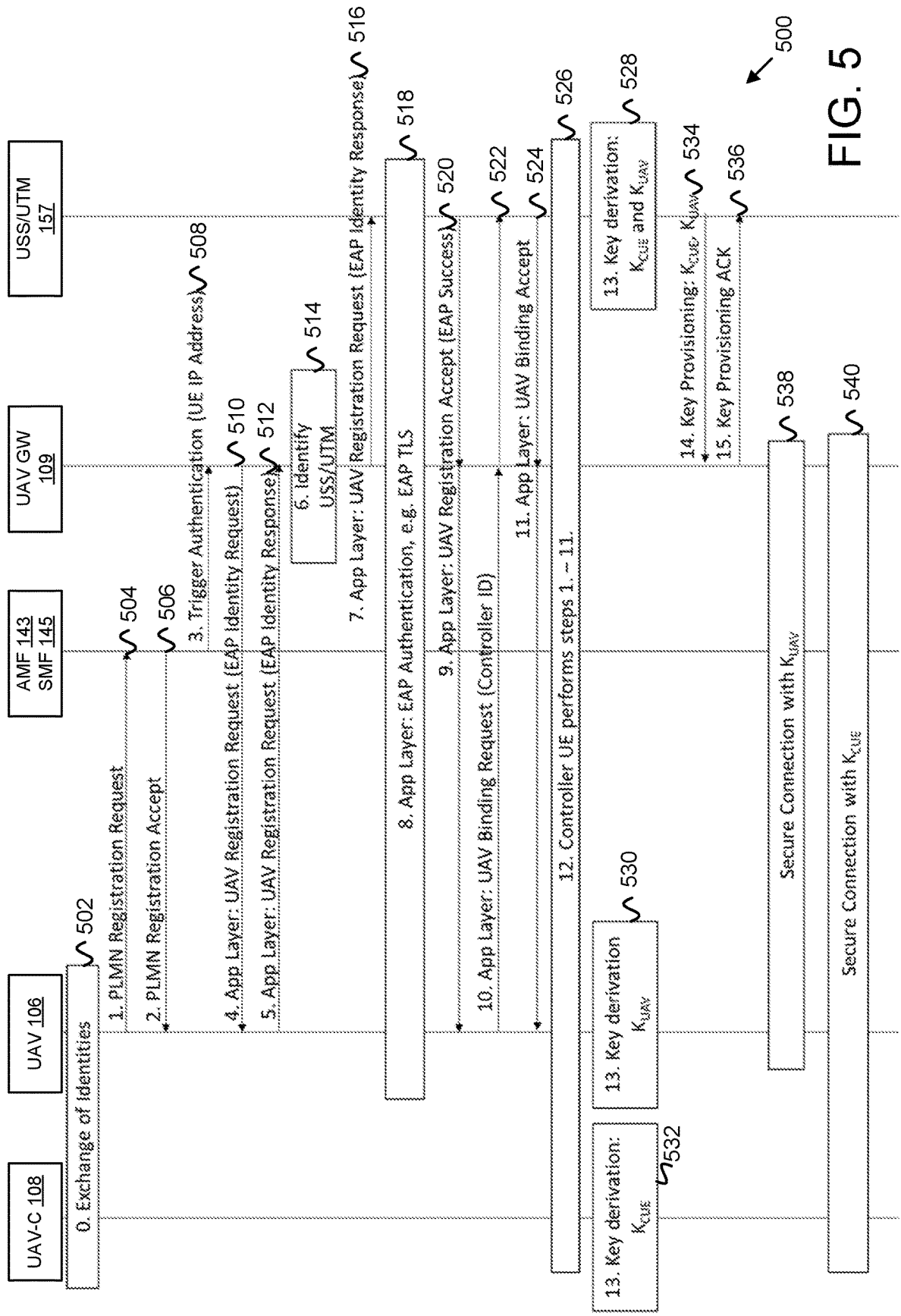
FIG. 5 is a signal flow diagram illustrating one embodiment of a procedure for secure communication setup with a preshared key.

FIG. 5 depicts a signal flow diagram illustrating one embodiment of a procedure 500 for securing communications between user equipment devices. The procedure 500 involves the UAV 106, the UAV-C 108, the AMF 143/SMF 145, the UAV GW 109, and the USS/UTM 157. In one embodiment, one or more steps of the procedure 500 are performed by a USS/UTM 157, a UAV GW 109, an authentication server, another network function, and/or a network equipment apparatus 700, described below.

In one embodiment, the procedure 500 enables secure communications between the UAV 106 or UAV-C 108 and the UAV GW 109. In the depicted procedure 500, in one embodiment, only the registration of the UAV 106 is shown in the FIG. 5; however, the UAV-C 108 performs the same steps as the UAV 106 with the network and USS/UTM 157. The UAV GW 109, in one embodiment, may take the role of the authenticator for EAP-based signaling.

At FIG. 5, the procedure 500 begins at step 0, in one embodiment, where the UAV 106 and the UAV-C 108 are exchange (see block 502) secret identities with each other. In one embodiment, in this flow, the UAV 106 is shown, but the UAV-C 108 performs steps similar to the UAV 106. In one embodiment, at step 1, the UAV 106 registers (see messaging 504) to the PLMN, e.g., the UAV 106 performs a normal registration/attach procedure to the network. The details of the registration/attach procedure are not depicted here.

At step 2, the AMF 143/SMF 145 sends (see messaging 506) the Registration/Attach Accept message to the UAV 106. The MME/AMF 143 selects an IP Gateway (e.g., UAV GW 109), responsible to interwork on application layer the authentication signaling between UAV 106 and USS/UTM 157. The AMF 143/SMF 145/MME may send the IP address of the UAV GW 109 to the UAV 106 in the Registration/Attach Accept message.

At step 3, in one embodiment, after successful registration to the PLMN, the UAV 106 has IP connectivity. The AMF 143/SMF 145/MME triggers (see messaging 508) the authentication procedure by sending a trigger message, including the UAV's IP address, to a UAV GW 109. The UAV GW 109, in one embodiment, takes the role as authenticator and interworks the authentication signaling between the UAV 106 and the USS/UTM 157.

At step 4, in one embodiment, the UAV GW 109 sends (see messaging 510) a UAV Registration Request to the UAV 106. This message may be an EAP Identity Request or may be encapsulated in the EAP Identity Request for routing purposes.

At step 5, in one embodiment, the UAV 106 responds (see messaging 512) with a EAP Identity Response. If an EAP message in tunnel mode is used, the UAV may send the EAP Identity set to anonymous.

At step 6, the UAV GW 109 identifies (see block 514) the responsible USS/UTM 157 based on the realm of the EAP identity. At step 7, in one embodiment, the UAV GW 109 forwards (see messaging 516) the UAV Registration Request with the EAP Identity Response to the USS/UTM 157.

In one embodiment, at step 8, the USS/UTM 157 and the UAV 106 exchange (see block 518) messages according to the EAP method. At step 9, in one embodiment, the USS/UTM 157 sends (see messaging 520) a UAV Registration Accept with the EAP Success to the UAV 106.

In one embodiment, at step 10, the UAV 106 sends (see messaging 522) a UAV Binding Request with the UAV-C ID. The UAV-C 108, e.g., the UE Controller, in this step may send the UAV ID instead. At step 11, in one embodiment, the USS/UTM 157 binds (see messaging 524) the two IDs of the UAV-C 108 and the UAV 106 together. The USS/UTM 157 may wait for a final binding until the request from the UAV-C 108 is received in the USS/UTM 157.

At step 12, in one embodiment, the UAV-C 108 performs (see block 526) the same steps 1 to 11 similar to the UAV 106. The UAV-C 108 may perform the steps before, after or in parallel to the UAV 106 because it is an independent device.

It is assumed in the following, in one embodiment, that the UAV 106 and UAV-C 108 communicate with each other via the UAV GW 109 in a secure way via application layer signaling. For this reason, the UAV 106 and UAV GW 109 as well as the UAV-C 108 and UAV GW 109 setup a secure connection based on the key material already generated during the EAP-based authentication. The most significant 256 bits of EMSK, in one embodiment, are used as $K_{root}$ for the input to the KDF to derive the next key used towards the UAV GW 109.

At step 13, in one embodiment, the UAV-C 108 generates (see block 532) the $K_{CUE}$=KDF ($K_{root}$, UAV ID), the UAV 106 generates (see block 530) $K_{UAV}$=KDF ($K_{root}$, Controller UE ID), and the USS/UTM 157 generates (see block 528) $K_{UAV}$ and $K_{CUE}$ in the same way as the UAV-C 108 and the UAV 106. In this manner, in one embodiment, the UAV-C 108 and the UAV 106 are cryptographically bound to each other.

At step 14, in one embodiment, the USS/UTM 157 provides (see messaging 534) the keys for the UAV-C 108 and the UAV 106, e.g., $K_{UAV}$ and $K_{CUE}$, to the UAV GW 109. The USS/UTM 157 may provide additional information (e.g., the IP addresses of the UAV-C 108 and the UAV 106 that are bound together) so that the UAV GW 109 can perform the necessary routing of the control messages between UAV-C 108 and the UAV 106.

At step 15, in one embodiment, the UAV GW 109 acknowledges (see messaging 536) the receipt of the keys and potential additional information. The UAV GW 109, in one II) embodiment, establishes a secure connection with the UAV 106 and the UAV-C 108 independently, but links the two connections together to achieve a low latency communication. There may be different ways of setting up a secure connection, e.g., the UAV GW 109 could send an application layer security setup message, already protected with the respective key, and the UAV 106 and UAV-C 108 would respond with an acknowledgement, also protected with the corresponding key.

It could also be the case, in one embodiment, that there is no explicit setup but the UAV-C 108 or UAV 106 start communicating with each other, already sending the messages protected with the corresponding keys. It could be that the UAV 106 and the UAV-C 108, in one embodiment, sets up an individual IPsec SA with corresponding keys $K_{UAV}$ and $K_{CUE}$ as input.

In this manner, secure connections between the UAV 106 and UAV GW 109 (see block 538) and between the UAV-C and the UAV GW 109 (see block 540) can be established and used to secure communications between the UAV 106 and the UAV-C 108.

Figure 6:
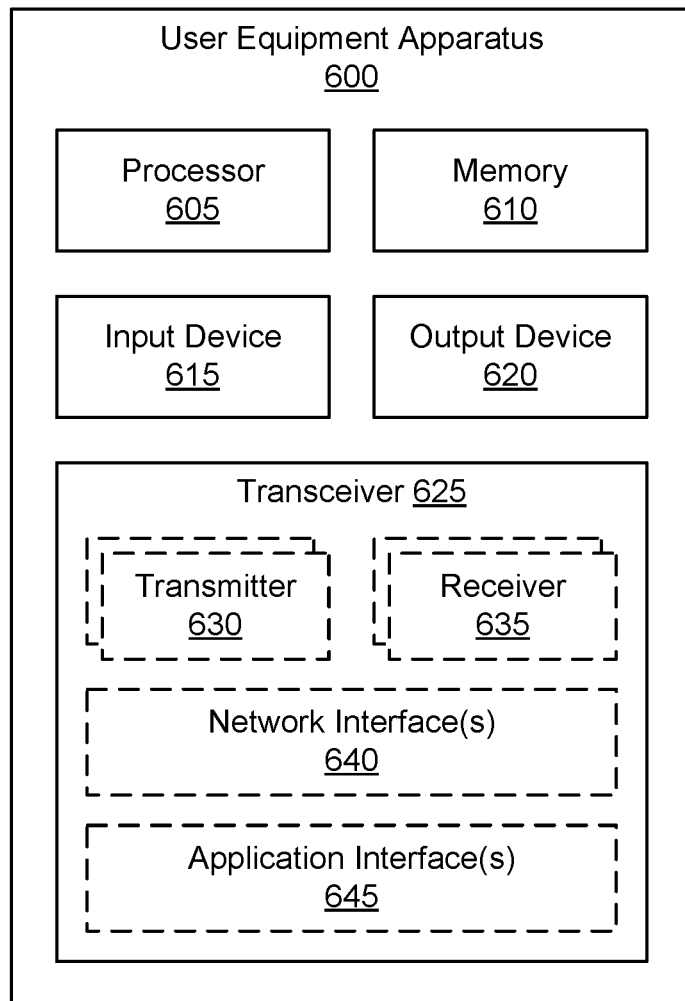
FIG. 6 is a block diagram illustrating one embodiment of a user equipment apparatus that may be used for securing communications between user equipment devices.

FIG. 6 depicts a user equipment apparatus 600 that may be used for securing communications between user equipment devices, according to embodiments of the disclosure. In various embodiments, the user equipment apparatus 600 is used to implement one or more of the solutions described above. The user equipment apparatus 600 may be one embodiment of the remote unit 105 and/or the UE 205, described above. Furthermore, the user equipment apparatus 600 may include a processor 605, a memory 610, an input device 615, an output device 620, and a transceiver 625.

In some embodiments, the input device 615 and the output device 620 are combined into a single device, such as a touchscreen. In certain embodiments, the user equipment apparatus 600 may not include any input device 615 and/or output device 620. In various embodiments, the user equipment apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. In some embodiments, the transceiver 625 communicates with one or more cells (or wireless coverage areas) supported by one or more base units 121. In various embodiments, the transceiver 625 is operable on unlicensed spectrum. Moreover, the transceiver 625 may include multiple UE panel supporting one or more beams. Additionally, the transceiver 625 may support at least one network interface 640 and/or application interface 645. The application interface(s) 645 may support one or more APIs. The network interface(s) 640 may support 3GPP reference points, such as Uu, N1, PCS, etc. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625. In certain embodiments, the processor 605 may include an application processor (also known as "main processor") which manages application-domain and operating system ("OS") functions and a baseband processor (also known as "baseband radio processor") which manages radio functions.

In various embodiments, the processor 605 controls the user equipment apparatus 600 to implement the above described UE behaviors. For example, the processor 605 may derive, at a first user equipment ("UE") device in communication with a mobile wireless communication network, a security key for securing communications between the first UE and a second UE via the mobile wireless communication network, the security key derived based on at least one parameter associated with the first UE and the second UE. In one embodiment, the processor 605 establishes a secure communication between the first UE and the second UE via a first network function of the mobile wireless communication network using the derived security key.

In one embodiment, the processor derives the security key using a key derivation function ("KDF"), the KDF receiving at least one of a root key, the UAV identifier, and the UAV controller identifier.

In one embodiment, the processor 605 further derives the security key using a nonce value received from the first network function. In one embodiment, the transceiver 625 sends a registration request message for the first UE device to the first network function, the registration request message comprising an EAP-Response packet that comprises a UAV registration request message and an identifier for the UAV.

In one embodiment, the processor 605 derives the security key in response to the transceiver receiving an EAP-Response packet comprising a UAV registration accept message and an EAP-Success indicating authentication with the first network function.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to securing communications between user equipment devices. For example, the memory 610 may store various parameters, panel/beam configurations, resource assignments, policies, and the like, as described above. In certain embodiments, the memory 610 also stores program code and related data, such as an operating system or other controller algorithms operating on the user equipment apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the user equipment apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all, or portions of the output device 620 may be integrated with the input device 615. For example, the input device 615 and output device 620 may form a touchscreen or similar touch-sensitive display. In other embodiments, the output device 620 may be located near the input device 615.

The transceiver 625 communicates with one or more network functions of a mobile communication network via one or more access networks. The transceiver 625 operates under the control of the processor 605 to transmit messages, data, and other signals and also to receive messages, data, and other signals. For example, the processor 605 may selectively activate the transceiver 625 (or portions thereof) at particular times in order to send and receive messages.

The transceiver 625 includes at least transmitter 630 and at least one receiver 635. One or more transmitters 630 may be used to provide UL communication signals to a base unit 121, such as the UL transmissions described herein. Similarly, one or more receivers 635 may be used to receive DL communication signals from the base unit 121, as described herein. Although only one transmitter 630 and one receiver 635 are illustrated, the user equipment apparatus 600 may have any suitable number of transmitters 630 and receivers 635. Further, the transmitter(s) 630 and the receiver(s) 635 may be any suitable type of transmitters and receivers. In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

In various embodiments, one or more transmitters 630 and/or one or more receivers 635 may be implemented and/or integrated into a single hardware component, such as a multi-transceiver chip, a system-on-a-chip, an ASIC, or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module.

Figure 7:
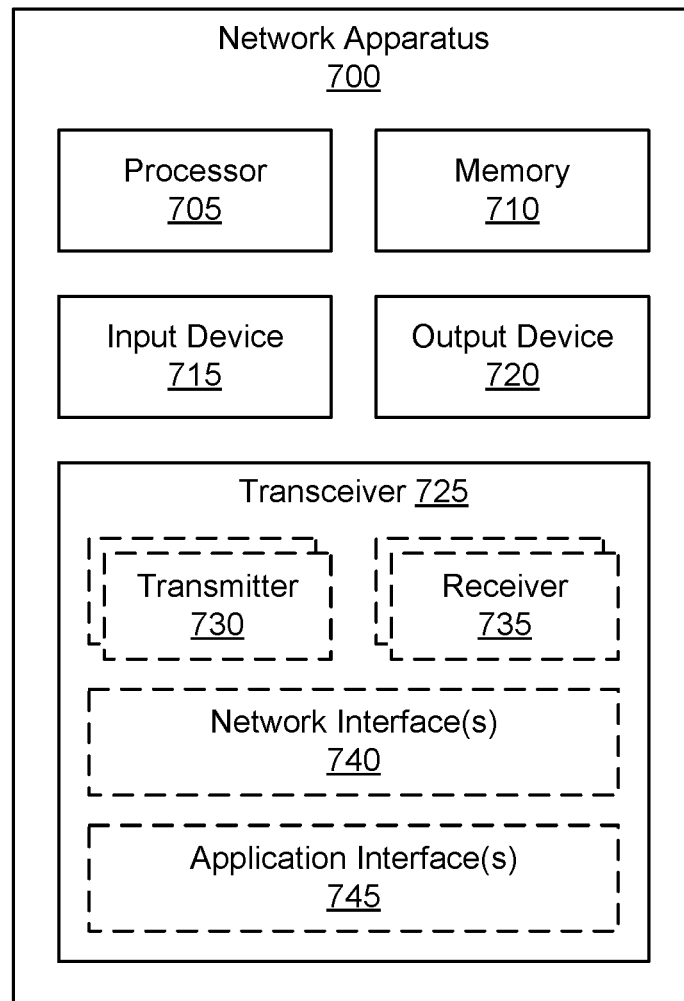
FIG. 7 is a block diagram illustrating one embodiment of a network apparatus that may be used for securing communications between user equipment devices.

FIG. 7 depicts a network apparatus 700 that may be used for securing communications between user equipment devices, according to embodiments of the disclosure. In one embodiment, network apparatus 700 may be one implementation of a RAN node, such as the base unit 121, the RAN node 210, or gNB, described above. Furthermore, the base network apparatus 700 may include a processor 705, a memory 710, an input device 715, an output device 720, and a transceiver 725.

In some embodiments, the input device 715 and the output device 720 are combined into a single device, such as a touchscreen. In certain embodiments, the network apparatus 700 may not include any input device 715 and/or output device 720. In various embodiments, the network apparatus 700 may include one or more of: the processor 705, the memory 710, and the transceiver 725, and may not include the input device 715 and/or the output device 720.

As depicted, the transceiver 725 includes at least one transmitter 730 and at least one receiver 735. Here, the transceiver 725 communicates with one or more remote units 105. Additionally, the transceiver 725 may support at least one network interface 740 and/or application interface 745. The application interface(s) 745 may support one or more APIs. The network interface(s) 740 may support 3GPP reference points, such as Uu, N1, N2, N3, N6, and N9. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a CPU, a GPU, an auxiliary processing unit, a FPGA, or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725. In certain embodiments, the processor 805 may include an application processor (also known as "main processor") which manages application-domain and operating system ("OS") functions and a baseband processor (also known as "baseband radio processor") which manages radio function.

In various embodiments, the network apparatus 700 is a USS/UTM 157, described above. In such embodiments, the processor 705 derives, at a first network function of a mobile wireless communication network, a security key for securing communications between an unmanned aerial vehicle ("UAV") and a UAV controller via the mobile wireless communication network, the security key derived based on at least one parameter associated with the UAV and the UAV controller comprises an identifier for the UAV and an identifier for the UAV controller. In one embodiment, the transceiver 725 sends the derived security key to a second network function, the second network function securing communications between the UAV and the UAV controller using the security key.

In one embodiment, the processor 705 derives the security key using a key derivation function ("KDF"), the KDF receiving at least one of a root key, the UAV identifier, and the UAV controller identifier, wherein the root key comprises one of a key used for authenticating at least one of the UAV and the UAV controller and a key resulting from authenticating at least one of the UAV and the UAV controller.

In one embodiment, the processor 705 further derives the security key using a nonce value and the transceiver further sends the nonce value to the second network function. In further embodiments, the transceiver further sends the UAV identifier and the UAV controller identifier to the second network function.

In various embodiments, the network apparatus 700 is a UAV GW 109, described above. In such embodiments, the transceiver 725 receives, at a first network function from a second network function, an authentication result for a first UE device, a first security key derived at the first network function, an identifier for the first UE device, and an identifier for a second UE device configured to communicate with the first UE device. In one embodiment, the transceiver 725 sends, from the first network function, the authentication result to the first UE device, and receives, at the first network function, a second security key from the first UE device, the second security key derived at the first UE device and matching the first security key.

In one embodiment, the processor 705 establishes a secure communication with the first UE device based on the second security key and links communication paths between the first UE device and the second UE device based on the identifiers for the first UE device and the second UE device. In one embodiment, the transceiver 725 further receives a nonce value used to derive the first security key from the second network function and sends the received nonce value to the first UE device for use in deriving the second security key.

In one embodiment, the transceiver 725 sends a first message to the first UE device that comprises an EAP-5G/5G-Start packet, receives a second message from the first UE device that comprises a UAV registration request message that is encapsulated in an EAP-5G message, sends a third message to the second network function that comprises the UAV registration request message, receives a fourth message from the second network function that comprises an authentication result, the first security key, the identifier for the first UE device and the identifier for the second UE device, and forwards the authentication result to the first UE device encapsulated in an EAP-5G message.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to securing communications between user equipment devices. For example, the memory 710 may store parameters, configurations, resource assignments, policies, and the like, as described above. In certain embodiments, the memory 710 also stores program code and related data, such as an operating system or other controller algorithms operating on the network apparatus 700.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display separate from, but communicatively coupled to, the rest of the network apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all, or portions of the output device 720 may be integrated with the input device 715. For example, the input device 715 and output device 720 may form a touchscreen or similar touch-sensitive display. In other embodiments, the output device 720 may be located near the input device 715.

The transceiver 725 includes at least transmitter 730 and at least one receiver 735. One or more transmitters 730 may be used to communicate with the UE, as described herein. Similarly, one or more receivers 735 may be used to communicate with network functions in the NPN, PLMN and/or RAN, as described herein. Although only one transmitter 730 and one receiver 735 are illustrated, the network apparatus 700 may have any suitable number of transmitters 730 and receivers 735. Further, the transmitter(s) 730 and the receiver(s) 735 may be any suitable type of transmitters and receivers.

Figure 8:
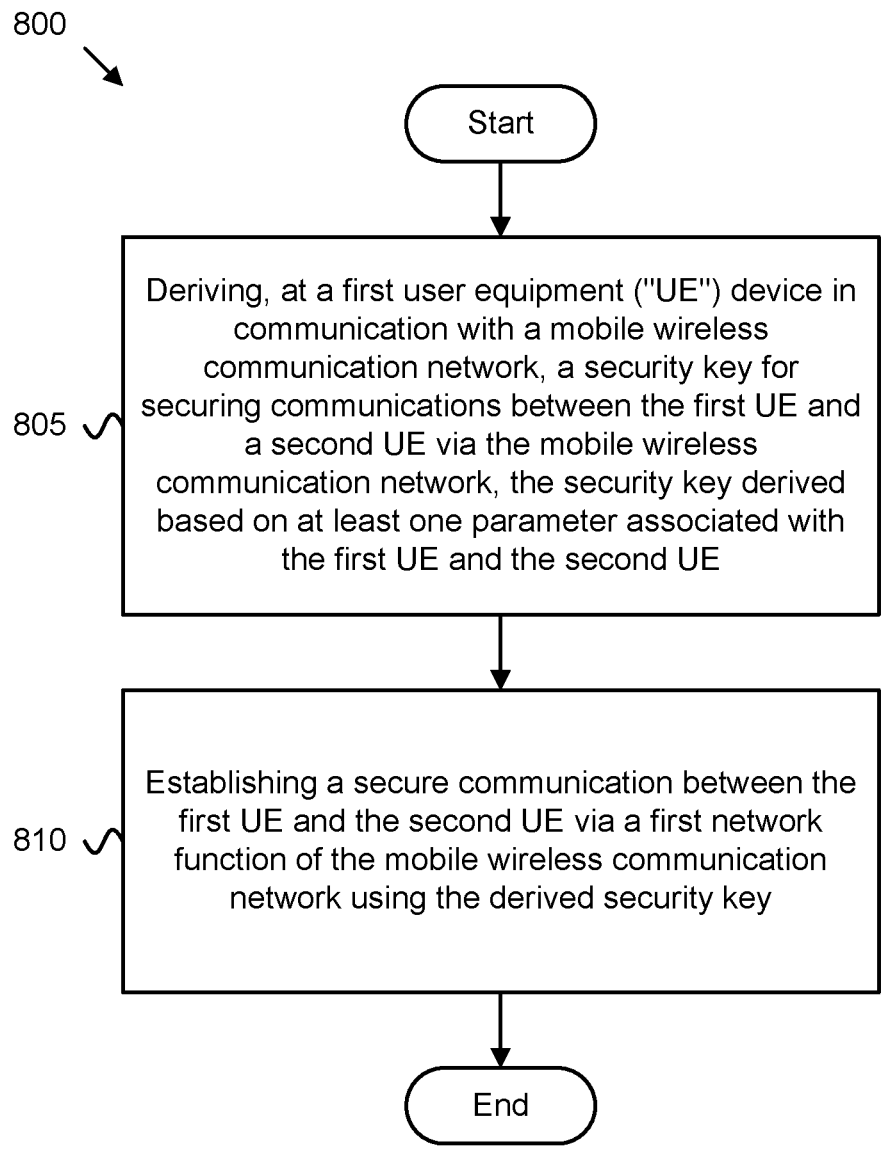
FIG. 8 is a flowchart diagram illustrating one embodiment of a method for securing communications between user equipment devices.

FIG. 8 is a flowchart diagram of a method 800 for securing communications between user equipment devices. The method 800 may be performed by a UE as described herein, for example, the remote unit 105, the UE 205, the UAV 106, the UAV-C 108, and/or the user equipment apparatus 600. In some embodiments, the method 800 may be performed by a processor executing program code, for example, a microcontroller, a microprocessor, a CPU, a GPU, an auxiliary processing unit, a FPGA, or the like.

In one embodiment, the method 800 includes deriving 805, at a first user equipment ("UE") device in communication with a mobile wireless communication network, a security key for securing communications between the first UE and a second UE via the mobile wireless communication network, the security key derived based on at least one parameter associated with the first UE and the second UE. The method 800, in further embodiments, includes establishing 810 a secure communication between the first UE and the second UE via a first network function of the mobile wireless communication network using the derived security key. The method 800 ends.

Figure 9:
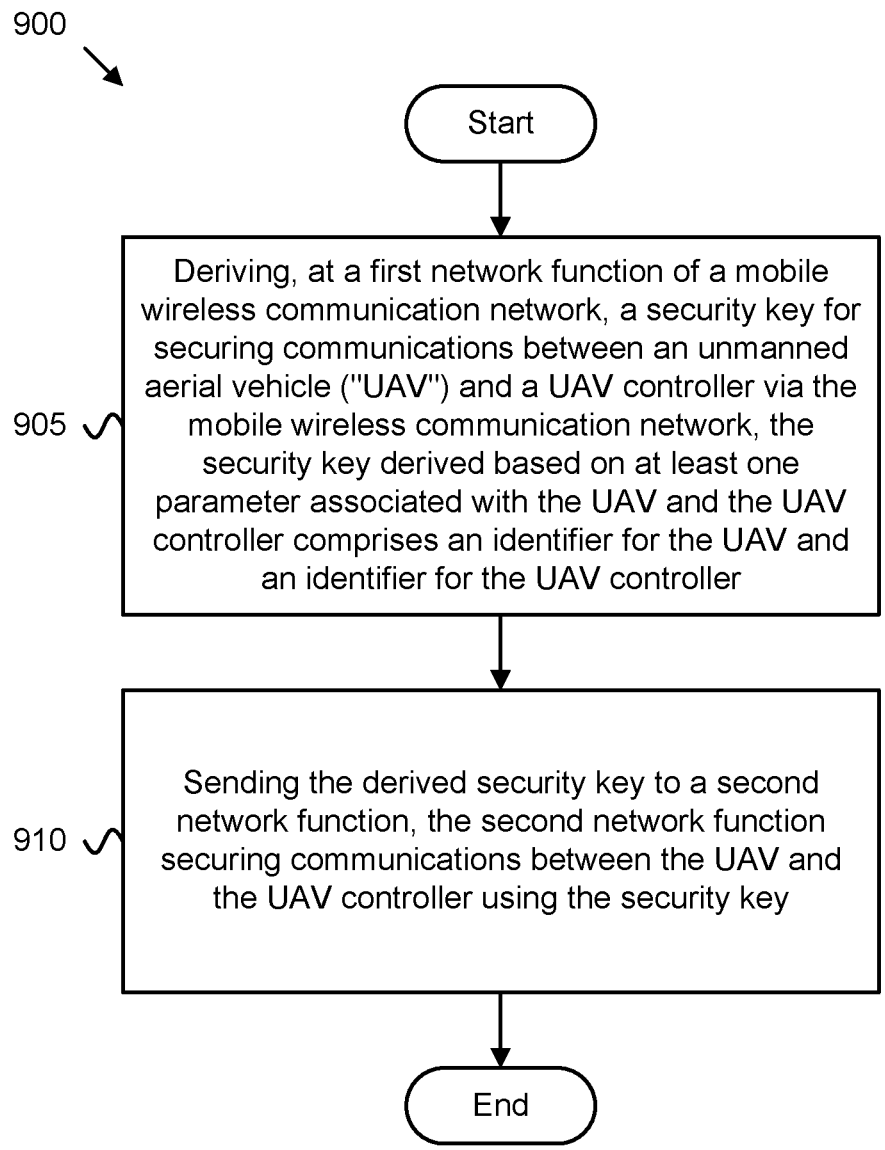
FIG. 9 is a flowchart diagram illustrating one embodiment of a method for securing communications between user equipment devices.

FIG. 9 is a flowchart diagram of a method 900 for securing communications between user equipment devices. The method 900 may be performed by a USS/UTM 157, an authentication server, another network function, and/or a network equipment apparatus 700 as described herein. In some embodiments, the method 900 may be performed by a processor executing program code, for example, a microcontroller, a microprocessor, a CPU, a GPU, an auxiliary processing unit, a FPGA, or the like.

In one embodiment, the method 900 includes deriving 905, at a first network function of a mobile wireless communication network, a security key for securing communications between an unmanned aerial vehicle ("UAV") and a UAV controller via the mobile wireless communication network, the security key derived based on at least one parameter associated with the UAV and the UAV controller comprises an identifier for the UAV and an identifier for the UAV controller. The method 900, in one embodiment, includes sending 910 the derived security key to a second network function, the second network function securing communications between the UAV and the UAV controller using the security key. The method 900 ends.

Figure 10:
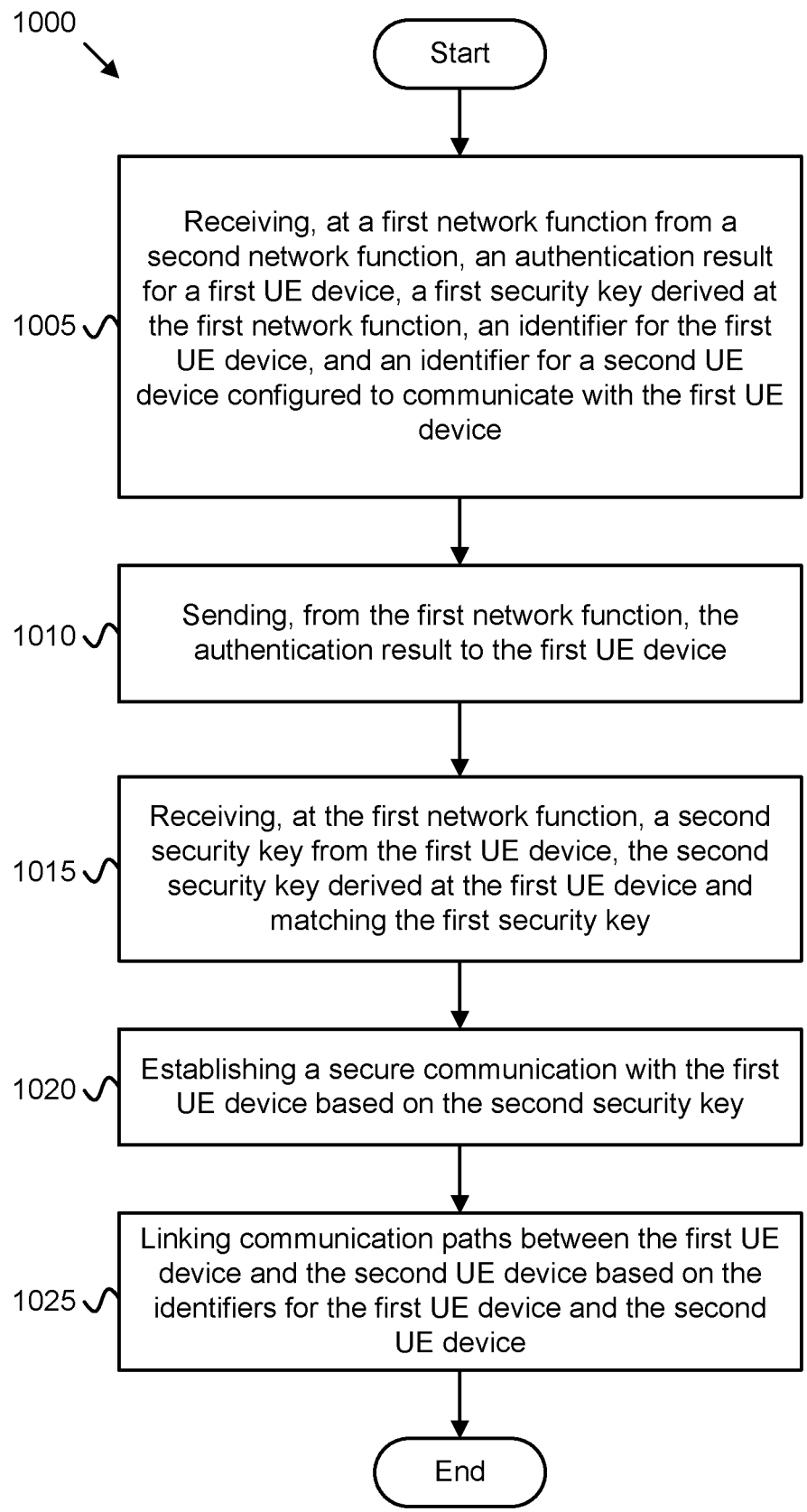
FIG. 10 is a flowchart diagram illustrating one embodiment of a method for securing communications between user equipment devices.

FIG. 10 is a flowchart diagram of a method 1000 for securing communications between user equipment devices. The method 1000 may be performed by a UAV GW 109, an authentication server, another network function, and/or a network equipment apparatus 700 as described herein. In some embodiments, the method 1000 may be performed by a processor executing program code, for example, a microcontroller, a microprocessor, a CPU, a GPU, an auxiliary processing unit, a FPGA, or the like.

In one embodiment, the method 1000 includes receiving 1005, at a first network function from a second network function, an authentication result for a first UE device, a first security key derived at the first network function, an identifier for the first UE device, and an identifier for a second UE device configured to communicate with the first UE device.

In one embodiment, the method 1000 includes sending 1010, from the first network function, the authentication result to the first UE device. In one embodiment, the method 1000 includes receiving 1010, at the first network function, a second security key from the first UE device, the second security key derived at the first UE device and matching the first security key.

In one embodiment, the method 1000 includes establishing 1020 a secure communication with the first UE device based on the second security key. In one embodiment, the method 1000 includes linking 1025 communication paths between the first UE device and the second UE device based on the identifiers for the first UE device and the second UE device. The method 1000 ends.

A first apparatus is disclosed for securing communications between user equipment devices. The first apparatus may include a UE as described herein, for example, the remote unit 105, the UE 205, the UAV 106, the UAV-C 108, and/or the user equipment apparatus 600. In some embodiments, the first apparatus may include a processor executing program code, for example, a microcontroller, a microprocessor, a CPU, a GPU, an auxiliary processing unit, a FPGA, or the like.

In one embodiment, the first apparatus includes a processor that derives, at a first user equipment ("UE") device in communication with a mobile wireless communication network, a security key for securing communications between the first UE and a second UE via the mobile wireless communication network, the security key derived based on at least one parameter associated with the first UE and the second UE. In one embodiment, the processor establishes a secure communication between the first UE and the second UE via a first network function of the mobile wireless communication network using the derived security key.

In one embodiment, the first UE comprises a UAV and the second UE comprises a UAV controller, and the at least one parameter associated with the first UE and the second UE comprises an identifier for the UAV and an identifier for the UAV controller.

In one embodiment, the processor derives the security key using a key derivation function ("KDF"), the KDF receiving at least one of a root key, the UAV identifier, and the UAV controller identifier.

In one embodiment, the root key comprises one of a key used for authenticating at least one of the UAV and the UAV controller and a key resulting from authenticating at least one of the UAV and the UAV controller.

In one embodiment, the processor further derives the security key using a nonce value received from the first network function. In one embodiment, the apparatus includes a transceiver that sends a registration request message for the first UE device to the first network function, the registration request message comprising an EAP-Response packet that comprises a UAV registration request message and an identifier for the UAV.

In one embodiment, the processor derives the security key in response to the transceiver receiving an EAP-Response packet comprising a UAV registration accept message and an EAP-Success indicating authentication with the first network function.

A first method is disclosed for securing communications between user equipment devices. The first method may be performed by a UE as described herein, for example, the remote unit 105, the UE 205, the UAV 106, the UAV-C 108, and/or the user equipment apparatus 600. In some embodiments, the first method may be performed by a processor executing program code, for example, a microcontroller, a microprocessor, a CPU, a GPU, an auxiliary processing unit, a FPGA, or the like.

In one embodiment, the first method includes deriving, at a first user equipment ("UE") device in communication with a mobile wireless communication network, a security key for securing communications between the first UE and a second UE via the mobile wireless communication network, the security key derived based on at least one parameter associated with the first UE and the second UE. In one embodiment, the first method includes establishing a secure communication between the first UE and the second UE via a first network function of the mobile wireless communication network using the derived security key.

In one embodiment, the first UE comprises a UAV and the second UE comprises a UAV controller, and the at least one parameter associated with the first UE and the second UE comprises an identifier for the UAV and an identifier for the UAV controller.

In one embodiment, the first method includes deriving the security key using a key derivation function ("KDF"), the KDF receiving at least one of a root key, the UAV identifier, and the UAV controller identifier.

In one embodiment, the root key comprises one of a key used for authenticating at least one of the UAV and the UAV controller and a key resulting from authenticating at least one of the UAV and the UAV controller.

In one embodiment, the first method includes deriving the security key using a nonce value received from the first network function. In one embodiment, first method includes sending a registration request message for the first UE device to the first network function, the registration request message comprising an EAP-Response packet that comprises a UAV registration request message and an identifier for the UAV.

In one embodiment, the first method includes deriving the security key in response to the transceiver receiving an EAP-Response packet comprising a UAV registration accept message and an EAP-Success indicating authentication with the first network function.

A second apparatus is disclosed for securing communications between user equipment devices. The second apparatus may include a USS/UTM 157, another network function, and/or a network equipment apparatus 700 as described herein. In some embodiments, the second apparatus may include a processor executing program code, for example, a microcontroller, a microprocessor, a CPU, a GPU, an auxiliary processing unit, a FPGA, or the like.

In one embodiment, the second apparatus includes a processor that derives, at a first network function of a mobile wireless communication network, a security key for securing communications between an unmanned aerial vehicle ("UAV") and a UAV controller via the mobile wireless communication network, the security key derived based on at least one parameter associated with the UAV and the UAV controller comprises an identifier for the UAV and an identifier for the UAV controller. In one embodiment, the second apparatus includes a transceiver that sends the derived security key to a second network function, the second network function securing communications between the UAV and the UAV controller using the security key.

In one embodiment, the processor derives the security key using a key derivation function ("KDF"), the KDF receiving at least one of a root key, the UAV identifier, and the UAV controller identifier, wherein the root key comprises one of a key used for authenticating at least one of the UAV and the UAV controller and a key resulting from authenticating at least one of the UAV and the UAV controller.

In one embodiment, the processor further derives the security key using a nonce value and the transceiver further sends the nonce value to the second network function. In further embodiments, the transceiver further sends the UAV identifier and the UAV controller identifier to the second network function.

A second method is disclosed for securing communications between user equipment devices. The second method may be performed by a USS/UTM 157, an authentication server, another network function, and/or a network equipment apparatus 700 as described herein. In some embodiments, the second method may be performed by a processor executing program code, for example, a microcontroller, a microprocessor, a CPU, a GPU, an auxiliary processing unit, a FPGA, or the like.

In one embodiment, the second method includes deriving, at a first network function of a mobile wireless communication network, a security key for securing communications between an unmanned aerial vehicle ("UAV") and a UAV controller via the mobile wireless communication network, the security key derived based on at least one parameter associated with the UAV and the UAV controller comprises an identifier for the UAV and an identifier for the UAV controller. In one embodiment, the second method includes sending the derived security key to a second network function, the second network function securing communications between the UAV and the UAV controller using the security key.

In one embodiment, the second method includes deriving the security key using a key derivation function ("KDF"), the KDF receiving at least one of a root key, the UAV identifier, and the UAV controller identifier, wherein the root key comprises one of a key used for authenticating at least one of the UAV and the UAV controller and a key resulting from authenticating at least one of the UAV and the UAV controller.

In one embodiment, the second method includes deriving the security key using a nonce value and the transceiver further sends the nonce value to the second network function. In further embodiments, the second method includes sending the UAV identifier and the UAV controller identifier to the second network function.

A third apparatus is disclosed for securing communications between user equipment devices. The third apparatus may include a UAV GW 109, another network function, and/or a network equipment apparatus 700 as described herein. In some embodiments, the second apparatus may include a processor executing program code, for example, a microcontroller, a microprocessor, a CPU, a GPU, an auxiliary processing unit, a FPGA, or the like.

In one embodiment, the third apparatus includes a transceiver that receives, at a first network function from a second network function, an authentication result for a first UE device, a first security key derived at the first network function, an identifier for the first UE device, and an identifier for a second UE device configured to communicate with the first UE device. In one embodiment, the transceiver sends, from the first network function, the authentication result to the first UE device, and receives, at the first network function, a second security key from the first UE device, the second security key derived at the first UE device and matching the first security key.

In one embodiment, the third apparatus includes a processor that establishes a secure communication with the first UE device based on the second security key and links communication paths between the first UE device and the second UE device based on the identifiers for the first UE device and the second UE device.

In one embodiment, the first UE device comprises an unmanned aerial vehicle ("UAV") and the second UE device comprises a UAV controller. In one embodiment, the transceiver further receives a nonce value used to derive the first security key from the second network function and sends the received nonce value to the first UE device for use in deriving the second security key.

In one embodiment, the transceiver sends a first message to the first UE device that comprises an EAP-5G/5G-Start packet, receives a second message from the first UE device that comprises a UAV registration request message that is encapsulated in an EAP-5G message, sends a third message to the second network function that comprises the UAV registration request message, receives a fourth message from the second network function that comprises an authentication result, the first security key, the identifier for the first UE device and the identifier for the second UE device, and forwards the authentication result to the first UE device encapsulated in an EAP-5G message.

A third method is disclosed for securing communications between user equipment devices. The second method may be performed by a UAV GW 109, an authentication server, another network function, and/or a network equipment apparatus 700 as described herein. In some embodiments, the second method may be performed by a processor executing program code, for example, a microcontroller, a microprocessor, a CPU, a GPU, an auxiliary processing unit, a FPGA, or the like.

In one embodiment, the third method includes receiving, at a first network function from a second network function, an authentication result for a first UE device, a first security key derived at the first network function, an identifier for the first UE device, and an identifier for a second UE device configured to communicate with the first UE device.

In one embodiment, the third method includes sending, from the first network function, the authentication result to the first UE device, and receiving, at the first network function, a second security key from the first UE device, the second security key derived at the first UE device and matching the first security key.

In one embodiment, the first UE device comprises an unmanned aerial vehicle ("UAV") and the second UE device comprises a UAV controller. In one embodiment, the third method includes receiving a nonce value used to derive the first security key from the second network function and sending the received nonce value to the first UE device for use in deriving the second security key.

In one embodiment, the third method includes sending a first message to the first UE device that comprises an EAP-5G/5G-Start packet, receiving a second message from the first UE device that comprises a UAV registration request message that is encapsulated in an EAP-5G message, sending a third message to the second network function that comprises the UAV registration request message, receiving a fourth message from the second network function that comprises an authentication result, the first security key, the identifier for the first UE device and the identifier for the second UE device, and forwarding the authentication result to the first UE device encapsulated in an EAP-5G message.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:
1. A user equipment (UE), comprising:
at least one memory; and
at least one processor coupled with the at least one memory and configured to cause the UE to:

derive a security key for securing communications between the UE and a second UE, the security key derived based on an identifier for the UE, an identifier for the second UE, a root key, and a nonce value, wherein the root key comprises a pre-shared key associated with authentication of the UE and the second UE; and establish a secure communication between the first UE and the second UE via a first network function using the derived security key.

2. The UE of claim 1, wherein:

the UE comprises a UAV and the second UE comprises a UAV controller; and the identifier for the UE and the identifier for the second UE comprises an identifier for the UAV and an identifier for the UAV controller, respectively.

3. The UE of claim 2, wherein the at least one processor is configured to cause the UE to derive the security key using a key derivation function (KDF), the KDF receiving the root key, the identifier for the UAV, the UAV controller, or a combination thereof.

4. The UE of claim 3, wherein the root key comprises one of:

a key used for authenticating the UAV, the UAV controller, or a combination thereof; and a key resulting from authenticating the UAV, the UAV controller, or a combination thereof.

5. The UE of claim 3, wherein the nonce value is received from the first network function.

6. The UE of claim 2, wherein the at least one processor is configured to cause the UE to send a registration request message for the UE to the first network function, the registration request message comprising an EAP-Response packet that comprises a UAV registration request message and an identifier for the UAV.

7. The UE of claim 6, wherein the at least one processor is configured to cause the UE to derive the security key in response to receiving an EAP-Response packet comprising a UAV registration accept message and an EAP-Success indicating authentication with the first network function.

8. A network equipment (NE), comprising:

at least one memory; and at least one processor coupled with the at least one memory and configured to cause the NE to:

derive a security key for securing communications between an unmanned aerial vehicle (UAV) and a UAV controller, the security key derived based on an identifier for the UAV, an identifier for the UAV controller, a root key, and a nonce value, wherein the root key comprises a pre-shared key associated with authentication of the UAV and the UAV controller; and send the derived security key to a network function, the network function securing communications between the UAV and the UAV controller using the security key.

9. The NE of claim 8, wherein the at least one processor is configured to cause the NE to derive the security key using a key derivation function (KDF), the KDF receiving the root key, the identifier for the UAV, the identifier for the UAV controller, or a combination thereof.

10. The NE of claim 9, wherein the at least one processor is configured to cause the NE to send the nonce value to the network function.

11. The NE of claim 9, wherein the at least one processor is configured to cause the NE to send the identifier for the UAV and the identifier for the UAV controller to the network function.

12. A network equipment (NE), comprising:

at least one memory; and at least one processor coupled with the at least one memory and configured to cause the NE to:

receive a first security key derived at a first network function, an identifier for a first user equipment (UE), and an identifier for a second UE;

receive a second security key from the first UE, wherein the second security key is derived at the first UE;

receive a third security key from the second UE, wherein the third security key is derived at the second UE;

establish secure and independent communication paths with the first UE and the second UE in response to the second security key and the third security key matching the first security key; and link the secure and independent communication paths between the first UE and the second UE based on the identifiers for the first UE and the second UE.

13. The NE of claim 12, wherein the first UE comprises an unmanned aerial vehicle (UAV) and the second UE comprises a UAV controller.

14. The NE of claim 12, wherein the at least one processor is configured to cause the NE to receive a nonce value and send the received nonce value to the first UE and the second UE for use in deriving the second security key and the third security key.

15. The NE of claim 13, wherein the processor is configured to cause the NE to:

send a first message comprising an EAP-5G/5G-Start packet;

receive a second message comprising a UAV registration request message that is encapsulated in an EAP-5G message;

send a third message comprising the UAV registration request message;

receive a fourth message comprising an authentication result, the first security key, the identifier for the first UE and the identifier for the second UE device; and forward the authentication result encapsulated in an EAP-5G message.

16. The UE of claim 2, wherein the UAV and the UAV controller both establish independent secure connections with a UAV gateway for managing communications between the UAV and the UAV controller.

17. The UE of claim 16, wherein the independent secure connections with the UAV gateway are linked together to facilitate low-latency communications between the UAV and the UAV controller.

18. The UE of claim 1, wherein the root key is derived from the most significant 256 bits of an extended master session key (EMSK).

19. The NE of claim 8, wherein the root key comprises one of:

a key used for authenticating the UAV, the UAV controller, or a combination thereof; and a key resulting from authenticating the UAV, the UAV controller, or a combination thereof.

* * * * *